(12) United States Patent
Wang et al.

(10) Patent No.: US 12,086,677 B2
(45) Date of Patent: Sep. 10, 2024

(54) RADIO FREQUENCY IDENTIFICATION METHOD AND READER

(71) Applicant: SHENZHEN IDATA INFORMATION TECHNOLOGY CO., LTD, Shenzhen (CN)

(72) Inventors: Dongsheng Wang, Guangzhou (CN); Shian Shen, Shenzhen (CN); Yiran Huang, Shenzhen (CN)

(73) Assignee: SHENZHEN IDATA INFORMATION TECHNOLOGY CO., LTD, Shenzhen (CN)

( * ) Notice: Subject to any disclaimer, the term of this patent is extended or adjusted under 35 U.S.C. 154(b) by 0 days.

(21) Appl. No.: 18/089,153

(22) PCT Filed: Jul. 7, 2021

(86) PCT No.: PCT/CN2021/105046
§ 371 (c)(1),
(2) Date: Dec. 27, 2022

(87) PCT Pub. No.: WO2023/279299
PCT Pub. Date: Jan. 12, 2023

(65) Prior Publication Data
US 2024/0273319 A1 Aug. 15, 2024

(51) Int. Cl.
*G06K 7/10* (2006.01)
(52) U.S. Cl.
CPC .................. *G06K 7/10386* (2013.01)
(58) Field of Classification Search
CPC .................................................. G06K 7/10386
USPC .......................................................... 235/451
See application file for complete search history.

(56) References Cited

U.S. PATENT DOCUMENTS

| | | | |
|---|---|---|---|
| 2016/0192125 A1 | 6/2016 | Leland | |
| 2017/0181401 A1 | 6/2017 | Lefevre | |
| 2020/0034583 A1 | 1/2020 | Nikitin | |
| 2021/0382164 A1* | 12/2021 | Bayer | ................... G01S 13/584 |

FOREIGN PATENT DOCUMENTS

| | | |
|---|---|---|
| CN | 110647777 A | 1/2020 |
| CN | 113553867 A | 10/2021 |
| CN | 113553868 A | 10/2021 |
| CN | 113553869 A | 10/2021 |

* cited by examiner

*Primary Examiner* — Toan C Ly
(74) *Attorney, Agent, or Firm* — Jeenam Park (57) ABSTRACT

A radio frequency identification method and a reader, the reader comprises a camera, a display screen, a distance sensor, an antenna unit and a processor, the camera is configured to collect an image of a target electronic tag, and the display screen is configured to display an image of the target electronic tag, the distance sensor is configured to measure the distance d between the target electronic tag and the reader, and the antenna unit is configured to receive a radio frequency signal emitted by the target electronic tag. When the antenna unit only receives a radio frequency signal transmitted by one electronic tag, the reader reads the electronic tag; when the antenna unit receives radio frequency signals transmitted by a plurality of electronic tags, the processor filters out the target electronic tag according to the matching degree between the distance and a phase value of the radio frequency signal.

20 Claims, 8 Drawing Sheets

RADIO FREQUENCY IDENTIFICATION METHOD AND READER

CROSS-REFERENCE TO RELATED APPLICATIONS

This application is a continuation of co-pending International Patent Application No. PCT/CN2021/105046, filed on Jul. 7, 2021, the entire contents of which are incorporated herein by reference.

TECHNICAL FIELD

The present application relates to a radio frequency identification method and a reader, in particular to a radio frequency identification method and a reader for identifying a target electronic tag.

BACKGROUND

Radio Frequency Identification (RFID) is a kind of automatic identification technology. It performs non-contact two-way data communication through radio frequency, and uses radio frequency to read and write recording media (electronic tags or radio frequency cards), so as to achieve the purpose of identifying the target and exchanging data. A complete RFID system consists of three parts: reader, electronic tag and data management system. Its working principle is that the reader emits radio wave energy with a specific frequency to drive the circuit to send the internal data. At this time, the reader receives and interprets the data in sequence and sends it to the data management system for corresponding processing. UHF readers can identify and read the content of multiple tags at the same time at a long distance. However, these characteristics of UHF readers make it impossible to accurately read and locate a single or a small number of electronic tags among multiple electronic tags.

In view of the above problems, the present application provides a new radio frequency identification method and reader, and adopts new methods and technical means to solve these problems.

SUMMARY

In view of the problems faced by the background technology, the purpose of the present application is to provide a radio frequency identification method and a reader that aim through an aiming pattern and receive a radio frequency signal of an electronic tag directionally through an antenna unit.

To achieve the above object, the application adopts the following technical means:

The present application provides a reader, comprising: a laser unit, an antenna unit and a processor, wherein the laser unit is configured to emit an aiming light spot to aim at a target electronic tag, and to measure a distance between the target electronic tag and the reader, and the antenna unit is configured to receive a radio frequency emitted by the target electronic tag, when the antenna unit only receives a radio frequency signal transmitted by one electronic tag, the reader reads the electronic tag; when the antenna unit receives radio frequency signals transmitted by a plurality of electronic tags, the processor filters out the target electronic tag among the plurality of electronic tags according to the matching degree between the distance d measured by the laser unit and the phase values of the radio frequency signals received by the antenna unit.

Optionally, when the antenna unit receives the radio frequency signals of the plurality of electronic tags at the same time, the distance li corresponding to the phase values of the radio frequency signals transmitted by the plurality of electronic tags is calculated according to the following formula: li=c*Δϕ/4 πf, where c is speed of light, Δϕi (i=1, 2, 3 . . . the value corresponds to the number of the plurality of electronic tags) are the phase values of the radio frequency signals transmitted by the plurality of electronic tags, and f is frequency of the radio frequency signal; take a reminder form the distance d measured by the laser unit and a wavelength λ of the radio frequency signal: d−[d/λ ]*λ=x, where [ ] is the rounding symbol, which means to take the integer part of (d/λ), λ=c/f; compare li with x, when one of li is equal to or closest to x, the electronic tag with the corresponding phase value of Δϕi is the target electronic tag, or, when |lm−x| and |ln−x| do not exceed a certain threshold, the electronic tags with phase values of Δϕm and A on are all target electronic tags.

Optionally, the laser unit comprises a transmitter and a receiver, the transmitter is configured to project an aiming light spot, and the receiver is configured to receive a reflected laser light to measure the distance between the target electronic tag and the reader.

Optionally, the antenna unit comprises a phased array antenna, and a lobe angle of the antenna unit is defined by beamforming, and the reader is provided with a gear switch to adjust the lobe angle of the antenna unit.

Optionally, the gear switch is configured to expand the lobe angle of the antenna unit when the distance between the target electronic tags is close, and is configured to reduce the lobe angle of the antenna unit when the distance between the target electronic tags is long.

Optionally, the gear switch is configured to expand the lobe angle of the antenna unit when the density of the electronic tags around the target electronic tag is low, and is configured to reduce the lobe angle of the antenna unit when the density of the electronic tags around the target electronic tag is high.

Optionally, the aiming light spot coincides with a lobe center of the antenna unit.

Optionally, the reader comprises a camera and a display screen for collecting the image of the target electronic tag.

The present application provides a reader, comprising: an aiming unit, a distance sensor, an antenna unit and a processor, the aiming unit is configured to aim at a target electronic tag, the distance sensor is configured to measure a distance between the target electronic tag and the reader, and the antenna unit is configured to receive a radio frequency signal transmitted by the target electronic tag, when the antenna unit only receives a radio frequency signal transmitted by one electronic tag, the reader reads the electronic tag; when the antenna unit receives radio frequency signals transmitted by a plurality of electronic tags, the processor filters out the target electronic tag among the plurality of electronic tags according to the matching degree between the distance measured by the distance sensor and the phase values of the radio frequency signals received by the antenna unit.

Optionally, when the antenna unit receives the radio frequency signals of the plurality of electronic tags at the same time, the distance li corresponding to the phase values of the radio frequency signals transmitted by the plurality of electronic tags is calculated according to the following formula: $l_i = c \cdot \Delta\phi_i / 4\pi f$, where c is speed of light, $\Delta\phi_i$ (i=1, 2, 3 ... the value corresponds to the number of the plurality of electronic tags) are the phase values of the radio frequency signals transmitted by the plurality of electronic tags, and f is frequency of the radio frequency signal; take a reminder form the distance d measured by the distance sensor and a wavelength A of the radio frequency signal: $d-[d/\lambda] \cdot \lambda = x$, where [ ] is the rounding symbol, which means to take the integer part of $(d/\lambda)$, $\lambda = c/f$; compare li with x, when one of li is equal to or closest to x, the electronic tag with the corresponding phase value of $\Delta\phi_i$ is the target electronic tag, or, when |lm−x| and |ln−x| do not exceed a certain threshold, the electronic tags with phase values of $\Delta\phi m$ and A on are all target electronic tags.

Optionally, the antenna unit comprises a narrow beam antenna.

Optionally, the antenna unit comprises a phased array antenna, and a lobe angle of the antenna is defined by beamforming, and the reader is provided with a gear switch to adjust the lobe angle of the antenna unit.

Optionally, the gear switch is configured to expand the lobe angle of the antenna unit when the distance between the target electronic tags is close, and is configured to reduce the lobe angle of the antenna unit when the distance between the target electronic tags is long.

Optionally, the gear switch is configured to expand the lobe angle of the antenna unit when the density of the electronic tags around the target electronic tag is low, and is configured to reduce the lobe angle of the antenna unit when the density of the electronic tags around the target electronic tag is high.

Optionally, the aiming light spot is directed towards a lobe center of the antenna unit.

Optionally, the aiming unit comprises a camera and a display screen, the camera is configured to collect an image of the target electronic tag, the display screen is configured to display the image of the target electronic tag, and the display screen comprises an indicator for aiming at the target electronic tag, and the indicator marks a lobe center of the antenna unit.

The present application provides a radio frequency identification method, comprising: aim at a target electronic tag; measure the distance between the target electronic tag and a reader; receive a radio frequency signal transmitted by an electronic tag, when only a radio frequency signal of one electronic tag is received, the electronic tag is read; when the radio frequency signals of a plurality of electronic tags are received, match phase values of the radio frequency signals of the plurality of electronic tags with the distance, and filter out the target electronic tag.

Optionally, when the radio frequency signals of the plurality of electronic tags are received at the same time, the distance li corresponding to the phase values of the radio frequency signals transmitted by the plurality of electronic tags is calculated according to the following formula: $l_i = c \cdot \Delta\phi_i / 4\pi f$, where c is speed of light, $\Delta\phi_i$ (i=1, 2, 3 ... the value corresponds to the number of the plurality of electronic tags) are the phase values of the radio frequency signals transmitted by the plurality of electronic tags, and f is frequency of the radio frequency signal; take a reminder form the distance d measured by a laser unit and a wavelength A of the radio frequency signal: $d-[d/\lambda] \cdot \lambda = x$, where [ ] is the rounding symbol, which means to take the integer part of $(d/\lambda)$, $\lambda = c/f$; compare li with x, when one of li is equal to or closest to x, the electronic tag with the corresponding phase value of $\Delta\phi_i$ is the target electronic tag, or, when |lm−x| and |ln−x| do not exceed a certain threshold, the electronic tags with phase values of $\Delta\phi m$ and A on are all target electronic tags.

Optionally, the reader comprises a laser unit, and the laser unit is configured to emit an aiming light spot to aim at the target electronic tag, and to measure the distance between the target electronic tag and the reader.

Optionally, the reader comprises a camera and a display screen, and aiming at the target electronic tag comprises: collect an image of the target electronic tag through the camera, display the image of the target electronic tag through the display screen, and aim at the target electronic tag through an indicator on the display screen.

Compared with the prior art, the present application has the following beneficial effects:

In the radio frequency identification method and the reader of the present application, first aim at the target electronic tag, then determine the distance of the target electronic tag, and receive a radio frequency signal transmitted by an electronic tag, finally, according to the matching degree of the distance of the target electronic tag and the phase value of the radio frequency signal received by the antenna unit, determine the target electronic tag in one or more electronic tags in the target area, so that the reader can accurately locate and read a single or a small number of electronic tags in the target area without being affected by other electronic tags around.

In the radio frequency identification method and reader of the present application, a solution that may replace the existing barcode reading is proposed. The barcode reader will read which barcode the aimer points to, and will not read other barcodes; In the radio frequency identification method and reader of the present application, the reader will read which tag is aimed at which electronic tag the aiming light spot points to, without being affected by other surrounding electronic tags.

REFERENCE SIGNS

100. Reader; 1. Laser unit; 11. Transmitter; 12. Receiver 13. Aiming light spot; 2. Antenna unit; 21. Lens; 22. Lobe; 3. Processor; 4. Gear switch 5. Display screen; 51. Indicator; 6. Camera; 7. Distance Sensor; 8. Aiming Unit; 200. Electronic tag; 201. Target electronic tag.

DETAILED DESCRIPTION

In order to facilitate a better understanding of the purpose, structure, features, and effects of the present application, the present application will be further described in conjunction with the accompanying drawings and specific implementation methods.

The process of reading the electronic tag by the existing reader is relatively blind. When the electronic tag is within the reading range of the reader, the reader can read the electronic tag without caring about the specific position of the electronic tag. Moreover, since the working frequency band of the reader to read the electronic tag is usually in the megahertz, the attenuation is slow, the electromagnetic wave emitted by the reader can also activate the electronic tag after reflection, and the electromagnetic wave emitted by the electronic tag may also be received by the reader after reflection, that is, the electronic tag that is not targeted by the reader is also easy to be read by the reader. This cannot point to where to scan like scanning a barcode, which limits the usage scenarios of readers and electronic tags. Some active electronic tags are equipped with an indicator light or a buzzer. When the reader reads the active electronic tag, the read active electronic tag will give a prompt through the indicator light or the buzzer. However, passive electronic tags do not have enough energy to supply the indicator light or buzzer, and even if the energy supply problem is solved, the added indicator light or buzzer will increase the cost of the electronic tag. Even the cost of indicator lights or buzzers has been equal to the cost of passive electronic tags, which limits the popularization and application of this technology. More importantly, this method is still blind, and there is no way to scan where it points.

The radio frequency identification system and reader of the present application is to solve this problem, so that it can scan wherever it points. Whichever electronic tag the reader is aiming at, it will read the electronic tag, and will not read the electronic tag next to it. Or the reader aims at several electronic tags at the same time and reads these electronic tags at the same time, without reading the electronic tags that are not aimed at.

The process of reading electronic tags by the radio frequency identification system and reader of this application can be compared to the process of scanning barcodes with a scanner. The process of scanning a barcode by a scanner is usually like this: The user holds the scanner to emit the aiming pattern to aim at the barcode to be read, and the scanner captures the barcode image and decodes it. Due to the straight-line propagation of light and the rapid attenuation of visible light (terahertz), the scanner can only capture the barcode image aimed at by the aiming pattern, but not the barcode that is not aimed at the side. In layman's terms, it refers to scan where it points. Of course, the existing scanners can do group reading, that is, the scanner aims at several barcodes at the same time, and reads these barcodes at the same time, which also refers to scan where it points.

Figure 1:
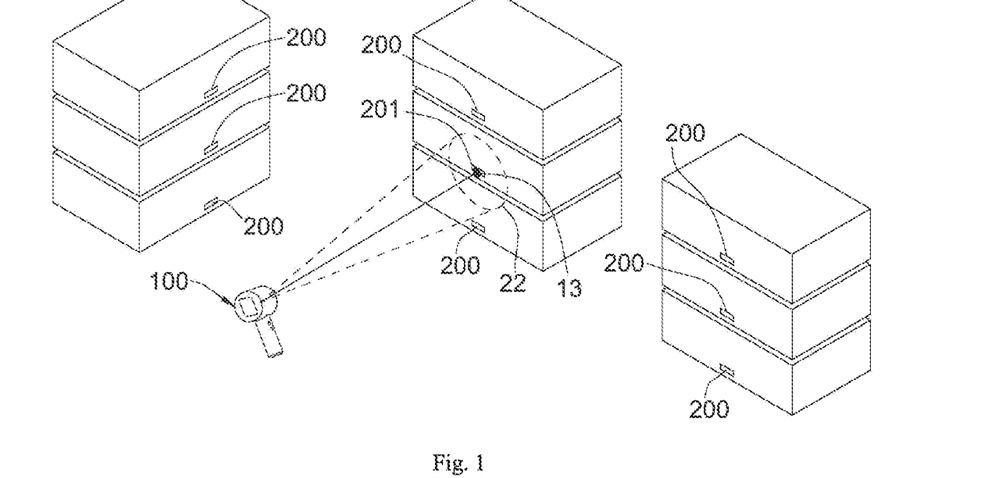
FIG. 1 is a schematic diagram of the radio frequency identification system of the present application.

As shown in FIG. 1, the radio frequency identification system of the present application comprises a reader 100 and one or more electronic tags 200 located in the target area, and the electronic tags 200 can be passive tags, active tags or semi-active tags, the following takes the electronic tag 200 as a passive tag as an example for illustration.

Figure 2:
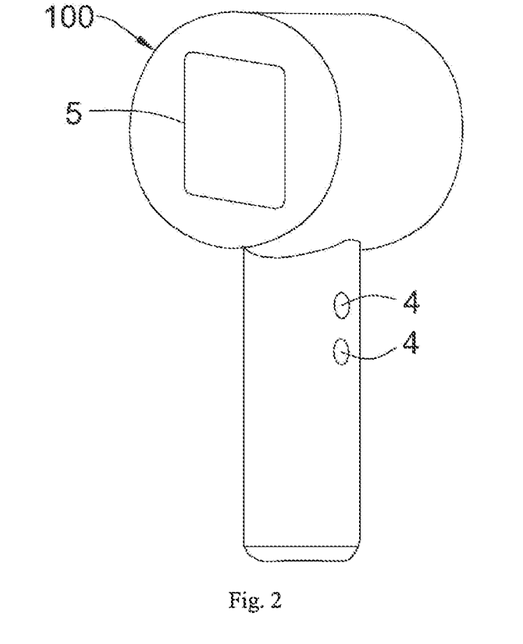
FIG. 2 is a perspective view of the reader of the present application.
Figure 3:
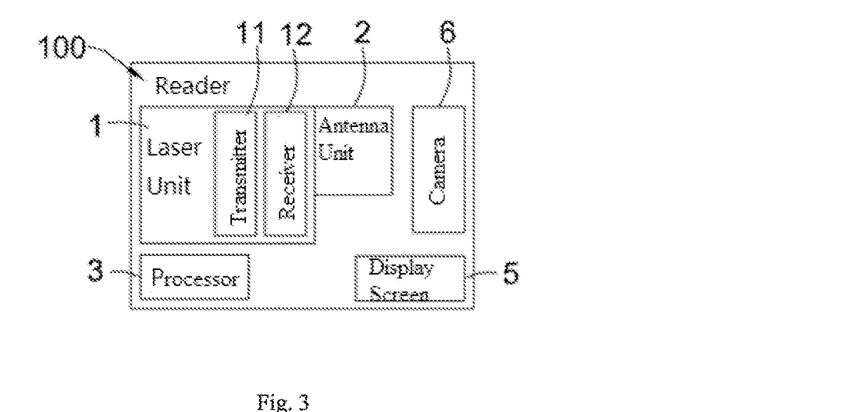
FIG. 3 is a block diagram of a reader according to an embodiment of the present application.

As shown in FIG. 2 and FIG. 3, the reader 100 comprises a laser unit 1, an antenna unit 2 and a processor 3.

The laser unit 1 comprises a transmitter 11 and a receiver 12. The transmitter 11 can emit an aiming light spot 13 to guide the user to aim at the target electronic tag 201 in the target area. The aiming light spot 13 is circular or cross-shaped. Of course, the aiming light spot 13 can also be an aiming frame, and the aiming frame can aim at one electronic tag 200 or at the same time a plurality of electronic tags 200. Alternatively, the aiming light spot 13 may be a combination of various shapes, for example, the center of the aiming frame has a circular or cross-shaped aiming light spot 13. Specific lenses can be configured for the laser unit 1 to form the aiming light spot 13 with a specific shape. The receiver 12 is used to receive the laser light reflected by the target area, so that the laser unit 1 also has a distance measuring function for measuring the distance between the target electronic tag 201 and the reader 100. This is easy to implement. For example, the laser unit 1 measures the distance between the target electronic tag 201 in the target area and the reader 100 through infrared laser ranging, and at the same time, the infrared laser is doped with visible red light, and the aiming light spot 13 formed by the red light can guide the user to aim at the target electronic tag 201, so that the laser unit 1 realizes the functions of ranging and aiming at the same time. It is conceivable that the laser unit 1 can perform ranging based on ranging principles such as time-of-flight ranging, phase ranging, or triangular ranging, and at the same time, the laser emitted by the laser unit 1 contains visible light, which can be used for aiming. It is conceivable that the aiming light spot 13 may not be easy to precisely aim at the target electronic tag 201, but slightly deviates from the target electronic tag 201. However, the distance between the aiming light spot 13 and other electronic tags 200 is greater than the distance d from the target electronic tag 201, and this error will also be considered later.

Figure 4:
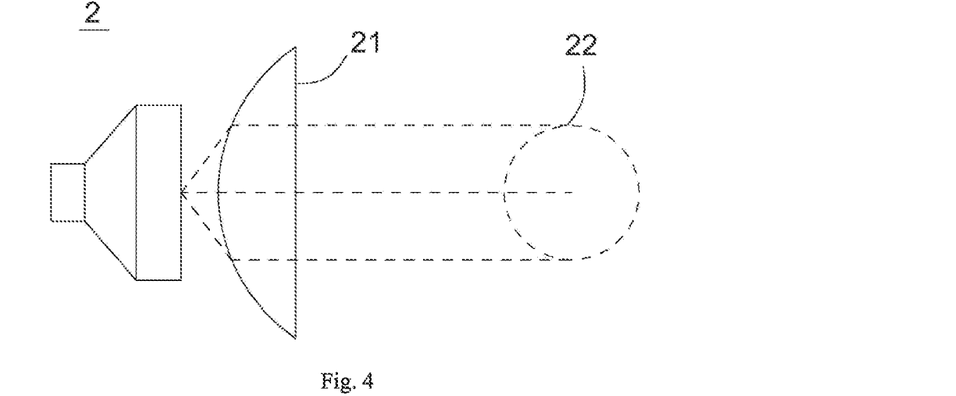
FIG. 4 is a schematic diagram of an antenna unit according to an embodiment of the present application.

The antenna unit 2 comprises a narrow-beam antenna, and the narrow-beam antenna may include a lens antenna, a parabolic antenna, a helical antenna, or a combination thereof. Taking the lens antenna shown in FIG. 4 as an example, after the electromagnetic beam emitted by the antenna passes through the lens 21, the beam is narrowed, the energy is concentrated, and the directionality is better.

Figure 5:
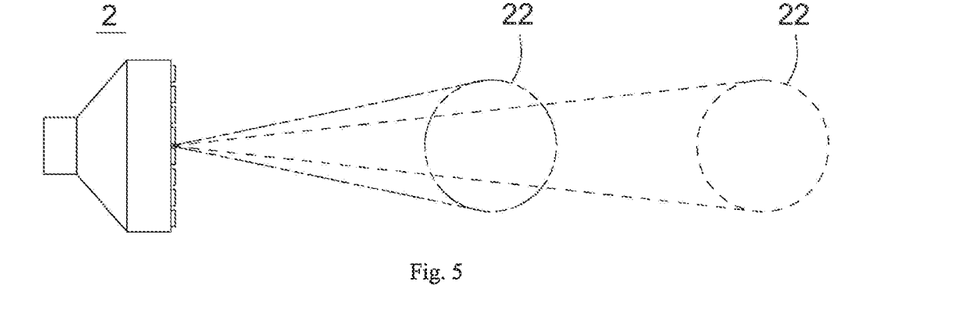
FIG. 5 is a schematic diagram of an antenna unit according to another embodiment of the present application, showing the adjustment of the lobe angle according to the distance.

Certainly, the narrow-beam antenna can also be an array antenna as shown in FIG. 5, and the array antenna can limit the angle of the beam 22 of the antenna unit 2 through beam-forming technology, so that the phased-array antenna emits narrow-beam electromagnetic waves. The angle of the wave lobe 22 of the antenna unit 2 can be controlled and adjusted, that is, when the target area is close, the user can expand the angle of the wave lobe 22 of the antenna unit 2, so that the user does not need to aim precisely, the reader 100 can read the target electronic tag 201. For example, the user only needs to aim the aiming light spot 13 at the edge of the target electronic tag 201 or a certain area around it, and the antenna unit 2 can receive the radio frequency signal of the target electronic tag 201. At the same time, the target electronic tag 201 is screened and read according to the matching degree between the distance measured by the laser unit 1 and the phase values of the radio frequency signals received by the antenna unit 2.

Further, the user can reduce the angle of the lobes 22 of the antenna unit 2 when the target area is far away, so that the lobes 22 of the antenna unit 2 cover a sufficiently small range on the target area. That is, the reading range of the antenna unit 2 surrounds the small area around the aiming light spot 13, so that the antenna unit 2 only receives the radio frequency signal emitted by the electronic tag 200 aimed at the aiming light spot 13, and is not affected by other electronic tags 200 around the electronic tag 200. At the same time, narrowing the angle of the wave lobe 22 of the antenna unit 2 can make the energy of the electromagnetic wave emitted by the antenna unit 2 more concentrated, and the reader 100 can excite or read the electronic tag 200 at a longer distance.

Figure 6:
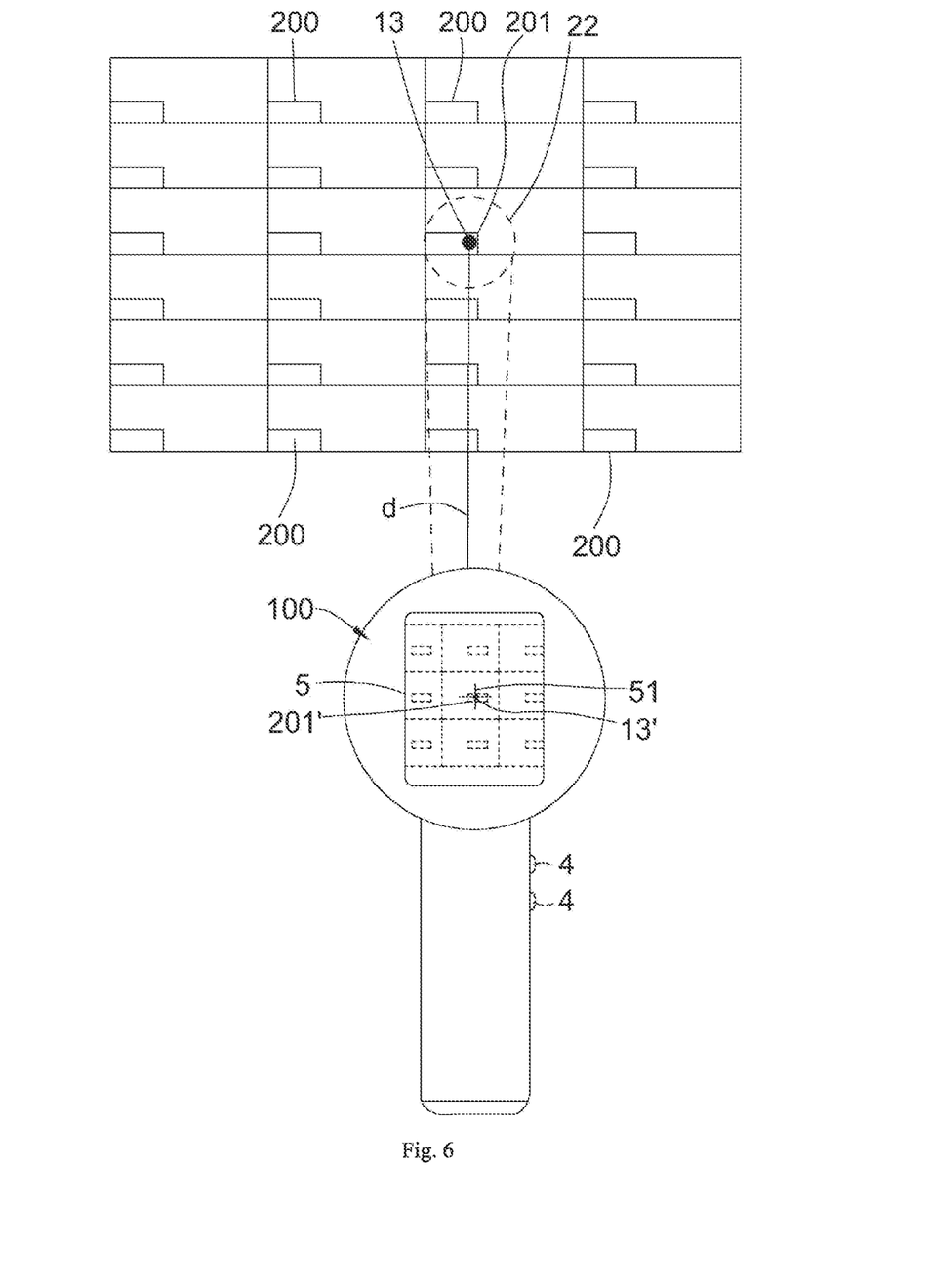
FIG. 6 is a schematic diagram of a radio frequency identification system according to an embodiment of the present application.
Figure 7:
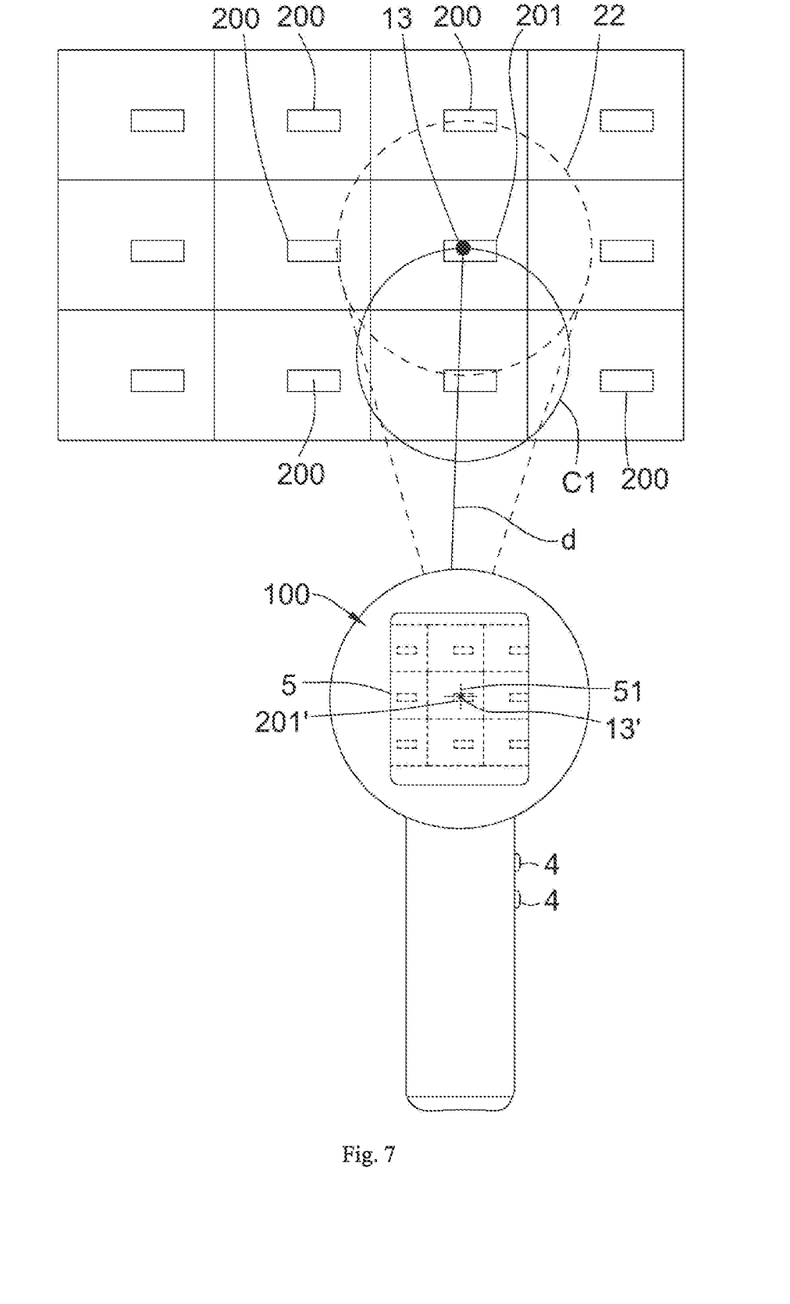
FIG. 7 is a schematic diagram of another radio frequency identification system according to another embodiment of the present application.

As shown in FIGS. 6 and 7, a gear switch 4 can be set on the reader 100 to adjust the angle of the wave lobe 22 of the antenna unit 2, and the gear switch 4 can be a mechanical switch or a virtual touch switch set on the display screen 5 of the reader 100.

In another application scenario, the angle of the lobe 22 of the antenna unit 2 can be adjusted according to the distribution density of the electronic tags 200 in the target area. That is, when the distribution density of the electronic tags 200 in the target area is low, the angle of the wave lobe 22 of the antenna unit 2 is expanded, and when the distribution density of the electronic tags 200 in the target area is large, the angle of the wave lobe 22 of the antenna unit 2 is reduced. This is also to improve the reading efficiency and at the same time ensure that the antenna unit 2 only receives the radio frequency signal emitted from the electronic tag 200 targeted by the aiming light spot 13, without being affected by other electronic tags 200 around the electronic tag 200.

As shown in FIG. 1, FIG. 6 and FIG. 7, the lobe center of the antenna unit 2 coincides with the aiming light spot 13, which can be realized through structural design. For example, the antenna unit 2 is arranged coaxially with the laser unit 1; or the antenna unit 2 is adjacent to the laser unit 1, so that the lobe center of the antenna unit 2 is almost coincident with the aiming light spot 13, and the distance between the two is very close, so that in actual use, it can be considered that the lobe center coincides with the aiming light spot 13.

According to the application scenario of the reader 100, the angle of the wave lobe 22 of the antenna unit 2 is adjusted in advance, so that the wave lobe 22 of the antenna unit 2 only covers a small area around the aiming light spot 13 in the target area. However, when the aiming light spot 13 is aimed at the target electronic tag 201, the wave lobe 22 of the antenna unit 2 only covers the target electronic tag 201 and does not cover other nearby electronic tags 200. This is an ideal situation, and the actual situation needs to consider factors such as the distance of the target area and the distribution density of the electronic tags 200.

The working process of the radio frequency identification system of the present application is explained below through specific examples. The situation that only one electronic tag 200 is set in the target area is relatively simple. The reader 100 can read the electronic tag 200 without being interfered by other electronic tags 200 only by aiming at the electronic tag 200 by emitting an aiming pattern through the reader 100.

Referring to FIG. 6 again, consider the situation that there are multiple electronic tags 200 in the target area. For example, when a user searches for an item in a warehouse, the electronic tag 200 encodes the information of the corresponding item, and the user triggers the laser unit 1 to emit the aiming light spot 13 to aim at the target electronic tag 201 in the target area, and simultaneously measure the target electronic tag 201 and the target electronic tag 201. The antenna unit 2 emits electromagnetic waves to excite the electronic tag 200 aiming at the spot 13, and then receives the radio frequency signal emitted by the electronic tag 200 aiming at the spot 13. When the antenna unit 2 only receives a radio frequency signal of one electronic tag 200, the processor 3 directly decodes the radio frequency signal, and the reader 100 reads the electronic tag 200 to obtain item information.

Please refer to another situation shown in FIG. 7, the wave lobe 22 of the antenna unit 2 covers a plurality of electronic tags 200 on the target area at the same time, and the situation shown in FIG. 6 does not consider the reflection of electromagnetic waves. That is, the radio frequency signals emitted by other electronic tags 200 next to the electronic tag 200 targeted by the aiming light spot 13 will also be received by the antenna unit 2 after reflection. In both cases, it is necessary to further exclude the radio frequency signals emitted by other electronic tags 200 to distinguish the radio frequency signal emitted by the target electronic tag 201 aimed at by the aiming light spot 13.

The processor 3 excludes radio frequency signals emitted by other electronic tags 200 according to the matching degree of the distance of the electronic tag 200 measured by the laser unit 1 and the phase values of the radio frequency signals received by the antenna unit 2, and distinguishes the radio frequency signal emitted by the electronic tag 200 aiming at the aiming light spot 13.

Firstly, the distance of the target electronic tag 201 is measured. The distance can be measured by the laser unit 1 or by other distance sensors 7. Taking distance measurement by the laser unit 1 as an example, the laser unit 1 emits an aiming light spot 13 to aim at the target electronic tag 201 in the target area. The distance measured by the laser unit 1 to the target electronic tag 201 aimed at by the aiming light spot 13 is d.

When the laser unit 1 is used as the center of the sphere, and the distance d is used as the radius to make a spherical surface, the intersection line between the spherical surface and the target area is the circle C1, and the distances from the points on the circle C1 to the laser unit 1 are all d. It can be seen that only the target electronic tag 201 is located on the circle C1, that is, the distance between the target electronic tag 201 and the laser unit 1 is d, while the distances between other electronic tags 200 and the laser unit 1 are not equal to d. Through this, the target electronic tag 201 can be identified. This is an ideal situation.

The actual situation may be that, depending on the distance d of the target electronic tag 201 and the distribution density of the electronic tags 200 in the target area, there may be a plurality of electronic tags 200 located on the circle C1 at the same time. Therefore, the target electronic tag 201 needs to be screened out from the plurality of electronic tags 200 located on the circle C1. It can be seen from FIG. 7 that as long as there is only one electronic tag 200 at the intersection of the electronic tag 200 covered by the lobes 22 of the antenna unit 2 and the electronic tag 200 located on the circumference C1, then the only electronic tag 200 is the target electronic tag 201. In other words, there is only one electronic tag 200 at the position where the lobe 22 of the antenna unit 2 intersects the circumference C1, and the only electronic tag 200 is the target electronic tag 201. The aforementioned technique of adjusting the angle of the lobes 22 of the antenna unit 2 according to the distance and distribution density of the target electronic tags 201 can be used to screen the target electronic tags 201 here. That is, the angle of the lobe 22 of the antenna unit 2 is adjusted according to the actual situation, so that there is only one electronic tag 200 at the position where the lobe 22 of the antenna unit 2 intersects the circle C1. In short, if the reader 100 only needs to read one electronic tag 200 at a time, ideally, by using a narrow beam antenna or an array antenna, the lobes 22 of the antenna unit 2 are narrow enough to cover only one electronic tag 200. Therefore, there is no need to consider that there are a plurality of electronic tags 200 at the position where the lobe 22 of the antenna unit 2 intersects the circle C1.

Next, the phase values of the radio frequency signals transmitted by the electronic tag 200 are obtained.

The reader 100 transmits a radio frequency signal with frequency f (usually about 900 MHz) to the electronic tag 200:

$$Stx = A\cos(2\pi ft + \phi) \quad (1)$$

In formula (1): A is the amplitude of the RF signal, and @ is the initial phase of the transmitted RF signal.

The radio frequency signal received by the reader 100 after being backscattered by the electronic tag 200 is:

$$Srx = \alpha \cdot \beta \cdot A\cos(2\pi ft + \phi - \Delta\phi) \quad (2)$$

In formula (2): a is the gain of the RF signal sent back, ß is the modulation factor of the electronic tag 200, and $\Delta\phi i$ is the phase difference (phase value) generated by the RF signal during the entire propagation process. When the radio frequency signal is reflected by the electronic tag 200 and then returns to the reader 100, after multiple full cycles, the problem of full cycle ambiguity will occur, so the distance between the reader 100 and the electronic tag 200 cannot be obtained according to the phase difference in formula (2).

Since the wave lobe 22 of the antenna unit 2 covers a plurality of electronic tags 200 in the target area, or the radio frequency signals of the plurality of electronic tags 200 are received by the antenna unit 2 after being reflected, the reader 100 will acquire the phase value (phase difference) of the plurality of electronic tags 200: $\Delta\phi 1$, $\Delta\phi 2$, $4\phi 3$ . . . $\Delta\phi i$ . . . .

Finally, the distance measured by the laser unit 1 is matched with the phase value (phase difference) of the plurality of electronic tags 200 obtained by the reader 100 to determine the target electronic tag 201 among the plurality of electronic tags 200. The specific process is as follows:

The wavelength of the radio frequency signal is:

$$\lambda = c/f \quad (3)$$

In formula (3): c is the speed of light.

Take a reminder from the distance d measured by the laser unit 1 and the wavelength of the radio frequency signal:

$$d - [d/\lambda] + \lambda = x \quad (4)$$

In formula (4): [ ] is a rounding symbol, which means taking the integer part of (d/λ).

The lengths corresponding to a plurality of phase values are obtained from the phase values (phase differences) $\Delta\phi 1$, $\Delta\phi 2$, $\Delta\phi 3$ of the plurality of electronic tags 200:

$$l1 = \lambda^* \Delta\phi 1/4\pi, \; l2 = \lambda^* \Delta\phi 2/4\pi, \; l3 = \lambda^* \Delta\phi 3/4\pi \ldots$$
$$li = \lambda^* \Delta\phi i/4\pi \ldots lm = \lambda^* \Delta\phi m/4\pi, \; ln = \lambda^* \Delta\phi n/4\pi \quad (5)$$

Substitute formula (3) into formula (5):

$$l1 = c^* \Delta\phi 1/4\pi f, \; l2 = c^* \Delta\phi 2/4\pi f, \; l3 = c^* \Delta\phi 3/4\pi f \ldots$$
$$li = c^* \Delta\phi i/4\pi f \ldots lm = c^* \Delta\phi m/4\pi f, \; ln = c^* \Delta\phi n/4\pi f \quad (6)$$

Compare the remainder x in formula (4) with the lengths l1, l2, l3 . . . in formula (6) in sequence. When li=x, the electronic tag 200 whose phase value (phase difference) is $\Delta\phi i$ is the target electronic tag 201, that is, the electronic tag 200 aimed at by the aiming light spot 13. Considering error factors, for example, when the aiming light spot 13 deviates slightly from the target electronic tag 201, so that l1, l2, l3 . . . are not equal to x, if among l1, l2, l3 . . . , li is the closest to x, then the electronic tag 200 whose phase value (phase difference) is $\Delta\phi i$ is the target electronic tag 201, that is, the electronic tag 200 aimed at by the aiming light spot 13.

When the aiming light spot 13 (such as the aiming frame) is aimed at multiple electronic tags 200 at the same time, and the reader 100 needs to read the targeted multiple electronic tags 200 at the same time, the threshold can be set for the difference or ratio between li and x according to the distribution density of electronic tags 200. For example, when both |lm−x| and |ln−x| do not exceed a certain threshold, the electronic tags 200 with phase values (phase difference) of $\Delta\phi m$ and A on are target electronic labels 201. Or when both lm/x and ln/x do not exceed a certain threshold, the electronic tags 200 whose phase values (phase differences) are $\Delta\phi m$ and $\Delta\phi n$ are target electronic tags 201.

It is conceivable that the reader 100 can be configured such that the user triggers the laser unit 1 to emit the aiming light spot 13, and after a preset time, the laser unit 1 measures the distance of the target electronic tag 201 again, so that the user has enough time to adjust the position of the aiming light spot 13 and precisely aim at the electronic tag 200 in the target area. After the laser unit 1 measures the distance of the target electronic tag 201, the antenna unit 2 receives the radio frequency signal emitted by the electronic tag 200 aiming at the light spot 13, so as to avoid that the reader 100 has already read other electronic tags 200 when the aiming light spot 13 has not aimed at the target electronic tag 201.

The processor 3 decodes the target electronic tag 201 and displays the information of the electronic tag 200 on the display screen 5.

Please refer to the embodiment shown in FIG. 6 and FIG. 7 again, through the combination of the aiming light spot 13, the camera 6 and the display screen 5, the reader 100 can aim at the same time. This is because when the target area is far away, the resolution of the camera 6 can be higher than that of the human eye, and the user can roughly aim through the aiming light spot 13, and then observe the image collected by the camera 6 through the display screen 5. Precisely adjust the position of the aiming light spot 13 or the indicator 51, so that the image 13' or the indicator 51 of the aiming light spot on the display screen 5 overlaps with the image 201' of the target electronic tag, and accurately aim at the target electronic tag 201.

Figure 8:
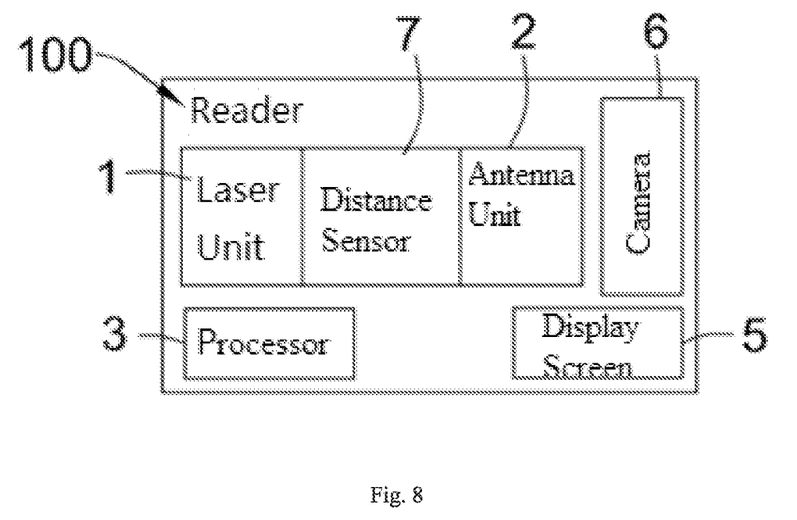
FIG. 8 is a block diagram of the reader according to another embodiment of the present application.

In an embodiment as shown in FIG. 8, the laser unit 1 only has an aiming function, and the reader 100 has another distance sensor 7 specially used for distance measurement, preferably with an accuracy of centimeter level or even millimeter level distance sensor 7, such as ultrasonic sensor, millimeter wave radar, etc.; The reader 100 guides the user to aim at the target area through the aiming light spot 13 emitted by the laser unit 1, and the distance sensor 7 is configured to measure the distance between the position where the aiming light spot 13 is aiming at and the reader 100.

At the same time, the aiming function of the laser unit 1 can be replaced by other aiming units 8, that is, the aiming light spot 13 is formed by a combination of an ordinary LED lamp and a lens instead of a laser aiming light, to perform aiming.

Figure 9:
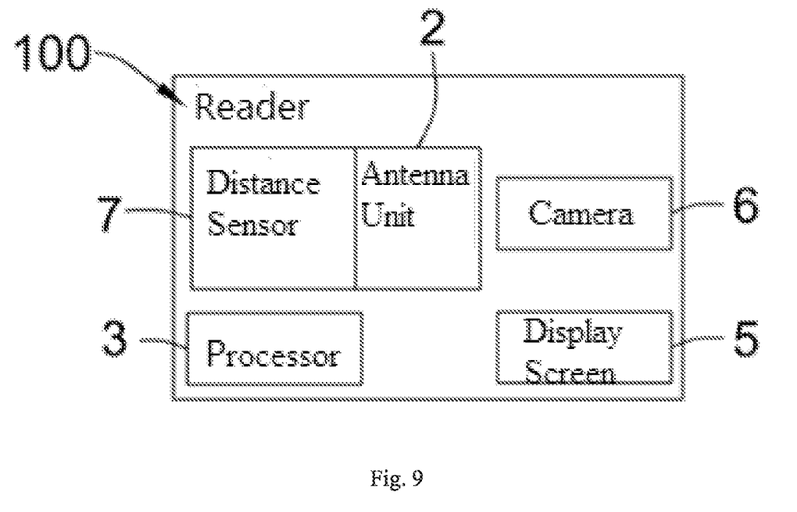
FIG. 9 is a block diagram of a reader according to another embodiment of the present application.

In an embodiment as shown in FIG. 9, the reader 100 comprises a camera 6 and a display screen 5, through which images are collected by the camera 6, and images collected by the camera 6 are displayed through the display screen 5. According to the image displayed on the display screen 5, the user adjusts the angle of the camera 6 to aim at the target area, and the position of the lobe center of the antenna unit 2 on the display screen 5 is indicated by the indicator 51 on the display screen 5. That is, the aiming function of the laser unit 1 is replaced by the cooperation of the camera 6 and the display screen 5, and the aiming pattern is replaced by the indicator 51.

In one embodiment, the reader 100 does not have a display screen 5, but uploads the information of the electronic tag 200 to a device with a display for display.

Figure 10:
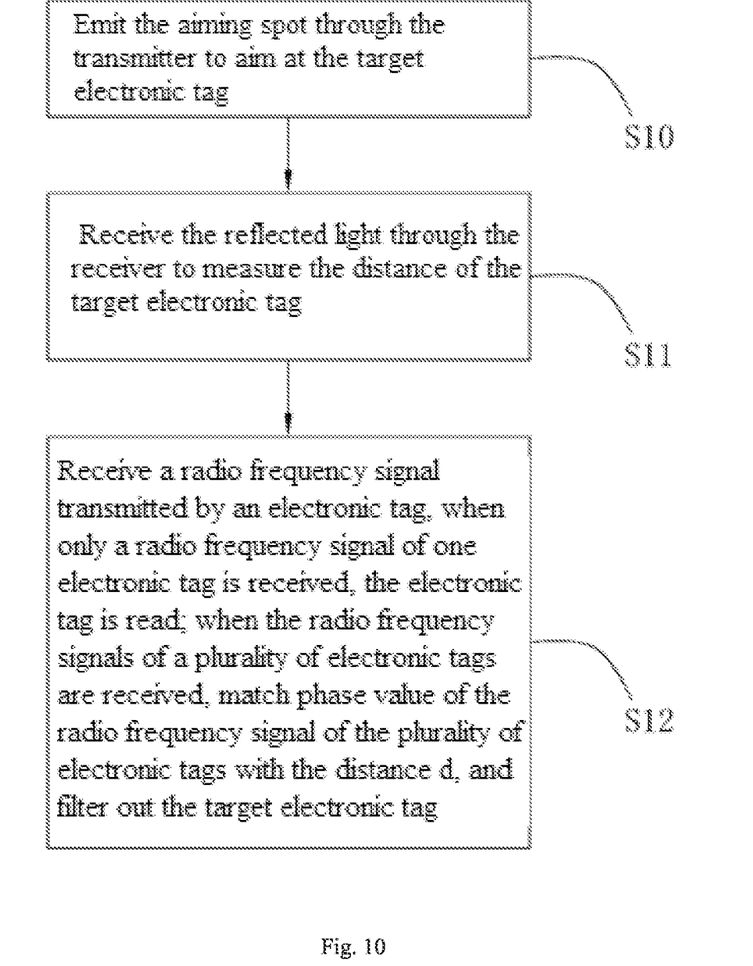
FIG. 10 is a flow chart of a radio frequency identification method according to an embodiment of the present application.

FIG. 10 shows a radio frequency identification method, which is a flow chart of the reader 100 of the aforementioned embodiment reading the target electronic tag 201, wherein the reader 100 uses the laser unit 1 to perform aiming and ranging, and including the following steps:

S10: Emit the aiming light spot 13 through the transmitter 11 to aim at the target electronic tag 201.

S11: Receive the reflected light through the receiver 12 to measure the distance of the target electronic tag 201.

S12: Receive a radio frequency signal transmitted by an electronic tag 200, when only a radio frequency signal of one electronic tag 200 is received, the electronic tag 200 is read; when the radio frequency signals of a plurality of electronic tags 200 are received, match phase values of the radio frequency signals of the plurality of electronic tags 200 with the distance d, and filter out the target electronic tag 201.

For the process of matching the phase value of the electronic tag 200 with the distance d, refer to the previous description, and details will not be repeated here.

Figure 11:
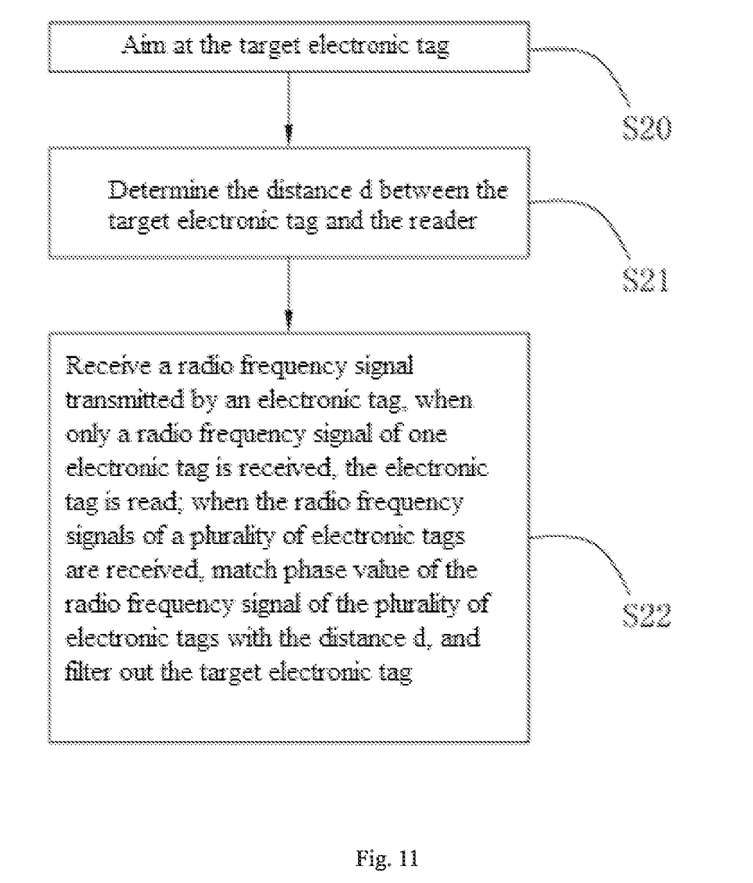
FIG. 11 is a flowchart of the radio frequency identification method according to another embodiment of the present application.

FIG. 11 shows a radio frequency identification method, which is a flowchart of reading the target electronic tag 201 by the reader 100 of the aforementioned embodiment, including the following steps:

S20: Aim at the target electronic tag 201.

Wherein, the aiming light spot 13 can be emitted by the laser unit 1, or the aiming light spot 13 can be generated by a common LED lamp with a lens, or aimed by the camera 6, or aimed by other mechanical structures.

S21: determine the distance d between the target electronic tag 201 and the reader 100.

Wherein, the distance may be measured by the laser unit 1 or by other distance sensors 7.

S22: Receive a radio frequency signal transmitted by an electronic tag 200, when only a radio frequency signal of one electronic tag 200 is received, the electronic tag 200 is read; when the radio frequency signals of a plurality of electronic tags 200 are received, match phase values of the radio frequency signals of the plurality of electronic tags 200 with the distance d, and filter out the target electronic tag 201.

For the process of matching the phase value of the electronic tag 200 with the distance d, refer to the previous description, and details will not be repeated here.

Figure 12:
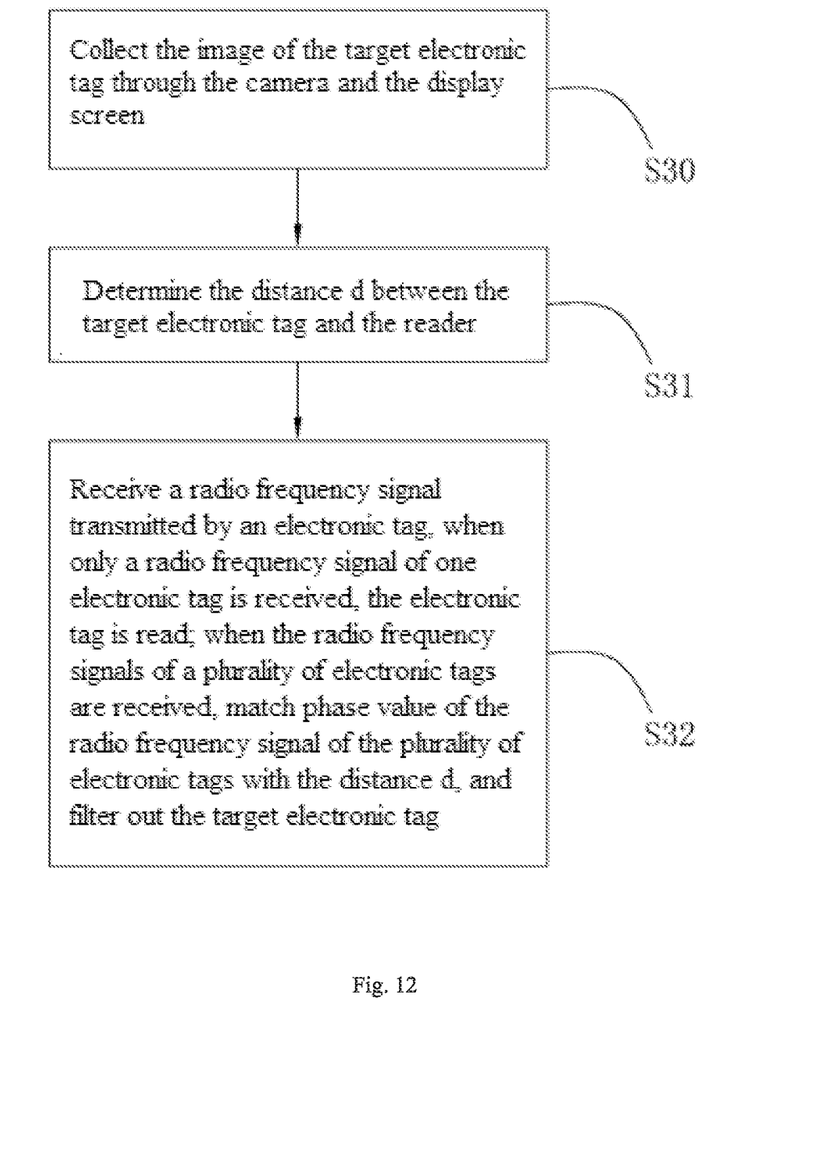
FIG. 12 is a flowchart of another radio frequency identification method according to another embodiment of the present application.

FIG. 12 shows a radio frequency identification method, which is a flowchart of reading the target electronic tag 201 by the reader 100 of the aforementioned embodiment, including the following steps:

S30: Collect the image of the target electronic tag 201 through the camera 6 and the display screen 5, so as to aim at the target electronic tag 201.

Wherein, the position of the lobe center of the antenna unit 2 on the display screen 5 is indicated by the indicator 51 on the display screen 5.

S31: determine the distance d between the target electronic tag 201 and the reader 100.

Wherein, the distance may be measured by the laser unit 1 or by other distance sensors 7.

S32: Receive a radio frequency signal transmitted by an electronic tag 200, when only a radio frequency signal of one electronic tag 200 is received, the electronic tag 200 is read; when the radio frequency signals of a plurality of electronic tags 200 are received, match phase values of the radio frequency signals of the plurality of electronic tags 200 with the distance d, and filter out the target electronic tag 201.

For the process of matching the phase value of the electronic tag 200 with the distance d, refer to the previous description, and details will not be repeated here.

The radio frequency identification method and reader of the present application have the following beneficial effects:

1. In the radio frequency identification method and the reader 100 of the present application, first aim at the target electronic tag 201, then determine the distance d of the target electronic tag 201, and receive a radio frequency signal transmitted by an electronic tag 200 through an antenna unit 2, finally, according to the matching degree of the distance d of the target electronic tag and the phase values of the radio frequency signals received by the antenna unit 2, determine the target electronic tag 201 in at least one electronic tags 200 in the target area, so that the reader 100 can accurately locate and read a single or a small number of electronic tags 200 in the target area without being affected by other electronic tags 200 around.

2. In the radio frequency identification method and reader 100 of the present application, a solution that may replace the existing barcode reading is proposed. The barcode reader will read which barcode the aimer points to, and will not read other barcodes; In the radio frequency identification method and reader 100 of the present application, the reader 100 will read which tag is aimed at which electronic tag 200 the aiming light spot 13 points to, without being affected by other surrounding electronic tags 200.

3. In the radio frequency identification method and reader 100 of the present application, aim at the target electronic tag 201 through the aiming light spot 13 emitted by the laser unit 1, and simultaneously measure the distance of the target electronic tag 201. The radio frequency signal transmitted by the electronic tag 200 is received by the antenna unit 2, and further according to the matching degree of the distance measured by the laser unit 1 and the phase values of the radio frequency signals received by the antenna unit 2, the target electronic tag 201 in the plurality of electronic tags 200 are determined, so that the reader 100 can accurately locate and read the target electronic tag 201. The target electronic tag 201 can be a passive tag, an active tag or a semi-active tag, so that there is no need to change the structure of the existing electronic tag 200 and it has universal applicability.

The above detailed description is only the description of the preferred embodiments of the present application, and does not limit the patent scope of the present application. Therefore, all equivalent technical changes made by using the instructions and illustrations of this creation are included in the patent scope of this creation.

What is claimed is:

1. A reader, comprising:
a laser unit, an antenna unit and a processor, wherein the laser unit is configured to emit an aiming light spot to aim at a target electronic tag, and to measure a distance between the target electronic tag and the reader, and the antenna unit is configured to receive a radio frequency emitted by the target electronic tag, when the antenna unit only receives a radio frequency signal transmitted by one electronic tag, the reader reads the electronic tag; when the antenna unit receives radio frequency signals transmitted by a plurality of electronic tags, the processor filters out the target electronic tag among the plurality of electronic tags according to the matching degree between the distance d measured by the laser unit and the phase values of the radio frequency signals received by the antenna unit.

2. The reader according to claim 1, wherein when the antenna unit receives the radio frequency signals of the plurality of electronic tags at the same time, the distance li corresponding to the phase values of the radio frequency signals transmitted by the plurality of electronic tags is calculated according to the following formula:
li=c*Δφi/4φf, where e is speed of light, Δφi (i=1, 2, 3 . . . the value corresponds to the number of the plurality of electronic tags) are the phase values of the radio frequency signals transmitted by the plurality of electronic tags, and f is frequency of the radio frequency signal;
take a reminder from the distance d measured by the laser unit and a wavelength λ of the radio frequency signal:
d−[d/λ] **=x, where [ ] is the rounding symbol, λ=c/f;
compare li with x, when one of li is equal to or closest to x, the electronic tag with the corresponding phase value of Δφi is the target electronic tag, or, when |lm−x| and |ln−x| do not exceed a certain threshold, the electronic tags with phase values of Δφm and Δφn are all target electronic tags.

3. The reader according to claim 1, wherein the laser unit comprises a transmitter and a receiver, the transmitter is configured to project the aiming light spot, and the receiver is configured to receive a reflected laser light to measure the distance between the target electronic tag and the reader.

4. The reader according to claim 1, wherein the antenna unit comprises a phased array antenna, and a lobe angle of the antenna unit is defined by beamforming, and the reader is provided with a gear switch to adjust the lobe angle of the antenna unit.

5. The reader according to claim 4, wherein the gear switch is configured to expand the lobe angle of the antenna unit when the distance between the target electronic tags is close, and is configured to reduce the lobe angle of the antenna unit when the distance between the target electronic tags is long.

6. The reader according to claim 4, wherein the gear switch is configured to expand the lobe angle of the antenna unit when the density of the electronic tags around the target electronic tag is low, and is configured to reduce the lobe angle of the antenna unit when the density of the electronic tags around the target electronic tag is high.

7. The reader according to claim 1, wherein the aiming light spot coincides with a lobe center of the antenna unit.

8. The reader according to claim 1, comprising a camera and a display screen for collecting the image of the target electronic tag.

9. A reader, comprising:
an aiming unit, a distance sensor, an antenna unit and a processor, the aiming unit is configured to aim at a target electronic tag, the distance sensor is configured to measure a distance between the target electronic tag and the reader, and the antenna unit is configured to receive a radio frequency signal transmitted by the target electronic tag, when the antenna unit only receives a radio frequency signal transmitted by one electronic tag, the reader reads the electronic tag; when the antenna unit receives radio frequency signals transmitted by a plurality of electronic tags, the processor filters out the target electronic tag among the plurality of electronic tags according to the matching degree between the distance measured by the distance sensor and the phase values of the radio frequency signals received by the antenna unit.

10. The reader according to claim 9, wherein when the antenna unit receives the radio frequency signals of the plurality of electronic tags at the same time, the distance li corresponding to the phase values of the radio frequency signals transmitted by the plurality of electronic tags is calculated according to the following formula:
li=c*Δφi/4πf, where c is speed of light, Δφi (i=1, 2, 3 . . . the value corresponds to the number of the plurality of electronic tags) are the phase values of the radio frequency signals transmitted by the plurality of electronic tags, and f is frequency of the radio frequency signal;
take a reminder form the distance d measured by the distance sensor and a wavelength λ of the radio frequency signal:
d−[d/λ]+λ=x, where [ ] is the rounding symbol, λ=c/f;
compare li with x, when one of li is equal to or closest to x, the electronic tag with the corresponding phase value of Δφi is the target electronic tag, or, when |lm−x| and |ln−x| do not exceed a certain threshold, the electronic tags with phase values of Δφm and Δφn are all target electronic tags.

11. The reader according to claim 9, wherein the antenna unit comprises a narrow beam antenna.

12. The reader according to claim 9, wherein the antenna unit comprises a phased array antenna, and a lobe angle of the antenna is defined by beamforming, and the reader is provided with a gear switch to adjust the lobe angle of the antenna unit.

13. The reader according to claim 12, wherein the gear switch is configured to expand the lobe angle of the antenna unit when the distance between the target electronic tags is close, and is configured to reduce the lobe angle of the antenna unit when the distance between the target electronic tags is long.

14. The reader according to claim 12, wherein the gear switch is configured to expand the lobe angle of the antenna unit when the density of the electronic tags around the target electronic tag is low, and is configured to reduce the lobe angle of the antenna unit when the density of the electronic tags around the target electronic tag is high.

15. The reader according to claim 9, wherein the aiming light spot is directed towards a lobe center of the antenna unit.

16. The reader according to claim 9, wherein the aiming unit comprises a camera and a display screen, the camera is configured to collect an image of the target electronic tag, the display screen is configured to display the image of the target electronic tag, and the display screen comprises an indicator for aiming at the target electronic tag, and the indicator marks a lobe center of the antenna unit.

17. A radio frequency identification method, comprising:
aim at a target electronic tag;
measure a distance between the target electronic tag and a reader;
receive a radio frequency signal transmitted by an electronic tag, when only a radio frequency signal of one electronic tag is received, the electronic tag is read; when the radio frequency signals of a plurality of electronic tags are received, match phase values of the radio frequency signals of the plurality of electronic tags with the distance, and filter out the target electronic tag.

18. The radio frequency identification method according to claim 17, wherein when the radio frequency signals of the plurality of electronic tags are received at the same time, the distance $l_i$ corresponding to the phase values of the radio frequency signals transmitted by the plurality of electronic tags is calculated according to the following formula:

$l_i = c * \Delta\varphi_i / 4\phi f$, where c is speed of light, $\Delta\varphi_i$ (i=1, 2, 3 . . . the value corresponds to the number of the plurality of electronic tags) are the phase values of the radio frequency signals transmitted by the plurality of electronic tags, and f is frequency of the radio frequency signal;

take a reminder form the distance d measured by a laser unit and a wavelength $\lambda$ of the radio frequency signal: $d-[d/\lambda] * \lambda = x$, where [ ] is the rounding symbol, $\lambda = c/f$;

compare $l_i$ with x, when one of $l_i$ is equal to or closest to x, the electronic tag with the corresponding phase value of $\Delta\varphi_i$ is the target electronic tag, or, when $|l_m - x|$ and $|l_n - x|$ do not exceed a certain threshold, the electronic tags with phase values of $\Delta\varphi_m$ and $\Delta\varphi_n$ are all target electronic tags.

19. The radio frequency identification method according to claim 17, wherein the reader comprises a laser unit, and the laser unit is configured to emit an aiming light spot to aim at the target electronic tag, and to measure the distance between the target electronic tag and the reader.

20. The radio frequency identification method according to claim 17, wherein the reader comprises a camera and a display screen, and aiming at the target electronic tag comprises: collect an image of the target electronic tag through the camera, display the image of the target electronic tag through the display screen, and aim at the target electronic tag through an indicator on the display screen.

* * * * *